United States Patent Office 3,535,120
Patented Oct. 20, 1970

3,535,120
METHOD OF IMPROVING THE SHELF-LIFE OF YEAST-LEAVENED BAKERY PRODUCTS
Edward F. Bouchard, Northport, and Carl P. Hetzel, Bellerose, N.Y., assignors to Chas. Pfizer & Co., Inc., New York, N.Y., a corporation of Delaware
No Drawing. Filed Jan. 16, 1967, Ser. No. 609,333
Int. Cl. A21d 2/16, 15/00
U.S. Cl. 99—91                                   3 Claims

ABSTRACT OF THE DISCLOSURE

Sodium, potassium and calcium salts of stearyl-2-lactylic acid having a surface area of at least about one square meter per gram and consisting of particles having an average spherical diameter of up to about five microns afford an improved shelf-life for bread and other finished bakery goods when incorporated into the dough of such goods prior to baking.

---

This invention relates to certain compositions and methods for improving the texture, antistaling properties and overall shelf-life of yeast-leavened doughs and of baked goods made from such doughs, especially breads, rolls, cakes and doughnuts. It is also concerned with a useful microcrystalline form of the sodium, potassium and calcium salts of stearyl-2-lactylic acid, and with processes for obtaining these aforementioned microcrystalline products. It is these unique forms of the stearyl-2-lactylic salts which are utilized as the bread softeners and dough improvers of the present invention.

In recent years, a new and large industry has arisen in the preparation and sale of prepackaged baked goods. It has been particularly difficult to obtain bakery products, wherein the principal leavening agent is yeast, which remain soft and fresh-appearing even when stored for any appreciable lengths of time. Doughmaking and baking have continued to be an art rather than an exact science. Besides variations in yeast and similar leavening agents, particularly critical are the specific variations in flour characteristics, not only between two different types of flours but even between two batches of the same flour. Bakery products made from doughs from different flour batches thus have varied widely in grain, texture, resistance to firming or staling and general overall quality. Among the more notable commercial bread softeners which have been developed are those described and claimed in U.S. Pat. No. 2,789,992 to the C. J. Patterson Co. of Kansas City, Mo. There the firming rate of baked leavened flour products and other bakery goods is retarded by the incorporation into the doughs prior to baking of certain salts of stearyl-2-lactylic acid. However, even with such compositions, the shelf-life storage of the products is not nearly so long as the baking industry would like and the search for still further and better bread softeners continues.

It is an object, therefore, of the present invention to provide even more improved dough additives which even further lengthen the shelf-life of the yeast-leavened bakery products. Another object is to provide processes for making these improved additives. These and other objects are accomplished by the present discovery, which broadly encompasses incorporating into the yeast-leavened doughs prior to baking from about 0.1 percent to about 2.0 percent, by weight of the flour content of said dough, of certain microcrystalline forms of stearyl-2-lactylic acid salts. When these new forms of stearyl-2-lactylic acid salts are substituted in yeast-leavened doughs on an equivalent weight basis for the conventional forms of the same acid or salt, the shelf-life storage of thet bakery product itself, i.e., the bread, rolls, or cakes, thereafter made from said dough, is increased by as much as one day. Alternatively, and also, of course, even more important in such a cost-conscious industry, to obtain essentially the same shelf-life storage for the ultimate bakery product as is obtained, for instance, with the conventional forms of the stearyl-2-lactylic acid salts taught in the aforementioned U.S. Pat. No. 2,789,992, one may substitute for that salt in the dough a smaller amount by weight of the corresponding instant microcrystalline form of the same acid salt.

The specific salts which are useful in the present invention are the sodium, potassium and calcium salts of stearyl-2-lactylic acid, which have been greatly reduced in particle size from the corresponding conventional forms of these salts by either dry-milling or by means of recrystallization from hot fats and oils, etc. The unique form of the stearyl-2-lactylate compound which is most useful here is that which has been subdivided into a microcrystalline structure, preferably by means of dry-milling.

The conventional forms hitherto known of each of the aforementioned salts of stearyl-2-lactylic acid have consisted of either flat platelets or amorphorus particles, substantially all of which have diameters of at least about 7 microns in size and 95% of which have diameters of at least about 10 microns (Coulter Counter data). The products of the present invention, made from these prior art forms, have average calculated spherical diameters of at most about 5 microns and preferably, at most about 3.5 microns. The reasons why this marked difference in particle size results in such marked differences in the bread softening qualities of the stearyl-2-lactylates are not presently known, but the fact remains that the instant microcrystalline forms, while retaining at least the same dough-improving properties as the conventional starting materials from which they are made, are most unexpectedly superior to the prior art forms in their ability to retard staling, i.e., to maintain bread softness.

The instant mircocrystalline products may be most economically obtained by dry-milling the corresponding pror art stearyl-2-lactylate salt, using milling and classifying equipment well-known to those skilled in th art, e.g., jet mills, ball mills or other impact mills, pin mills, micronizers and the like. Preferably, a mill with built-in classifier is employed, but alternatively the fines may be classified separately and the milling repeated until the requisite proportion of lactylate compound reaches the desired size. Especially useful are fluid energy mills like the Jet-O-Mizer, Raymond pulverizer-hammer mills, Alpine impact mills and Entoleter mills. The dry-milled stearyl-2-lactylate product thus obtained generally has an average Fisher spherical diameter of only up to about 2.5 microns and often only about 1.5 to 2.0 microns.

The only other process specifically useful for obtaining the specified salts of stearyl-2-lactylic acid of the desired microcrystalline size and structure embodies, as previously mentioned, recrystallization of the corresponding prior art salt form from a molten fat or oil. According to this latter technique, conventional coarsely-sized sodium, potassium or calcium stearyl-2-lactylate is dissolved in an edible oil or in a liquid fat system at an elevated temperature and then recrystallized from the solution by rapid cooling, while agitating to maintain a homogeneous dispersion of the microcrystalline lactylate salt in the lipid system. The resulting mass is then preferably used in the entirety to supply both the required shortening agent as well as lactylate bread softening compound for a yeast-leavened dough, but alternatively the fatty coated, finely-divided lactylate compound may be recovered from the solvent recrystallization system and used as such separately. In either case, of course, the oil or fat medium chosen should be an edible one, or at least one that is non-toxic in nature and must be liquid at the temperature employed in order to dissolve the desired lactylate compound.

According to preferred embodiments of this fat recrystalization process, from about 5% to about 40% by weight, and desirably say 15 to 25%, of the lactylate compound is used here by weight of the lipoid system. The resulting mixture is then heated with good agitation to a temperature in the range of approximately 100° C. to 140° C. and preferably, from 115° C. to 130° C., to solubilize the lactylate compound. Particularly satisfactory lipids for use in this connection include conventional liquid shortening agent such as cottonseed oil, soy bean oil, safflower oil and corn oil, as well as low-melting solid shortenings, e.g., lard and hydrogenated vegetable oil shortenings, etc. It will be obvious to those skilled in the art to which this invention pertains that the particular choices of lactylate and lipoid medium, their relative proportions, and the time and temperatures of heating them together are all necessarily interdependent. Generally, a fairly low amount, say 20%, of an easily soluble macrocrystalline salt in a vegetable oil which is liquid even at room temperature, when heated with efficient stirring to only about 120° C., is solubilized almost instantaneously. The heating is then stopped and the mass cooled quickly to room temperature, with or without artificial cooling means, as may be indicated, whereupon a thick, relatively clear dispersion soon results.

Especially preferred lactylate salts of the present invention are calcium stearyl-2-lactylates having a surface area of at least about 1.5 square meters per gram and consisting of particles with an average size, as measured by means of a Fisher Sub-Sieve Sizer, of from between about 1.0 and about 3.5 microns in spherical diameter. These products are especially well prepared by comminuting the prior art coarsely-sized salt in an impact mill of the Alpine type, or else by the above-described "hot fat" recrystallization techniques. The finely-divided products, in turn, then lend themselves particularly well to incorporation in the yeast-leavened doughs of the present invention. While up to about 2% by flour weight of this or the other products of the instant invention may be incoporated in the doughs with resulting improvement in the shelf-life storage of the ultimate bakery products, best bread softening results with least expense are generally obtained at a maximum lactylate content of about 1.0% by flour weight. With specific regard to the aforementioned calcium salt, the recommended level is about 0.5% by weight of the flour in said dough, since the U.S. Food and Drug Administration has previously authorized this amount in yeast-leavened doughs. Of course, still lesser amounts of the new microcrystalline products may be employed, but the useful minimum amount necessary for achieving appreciable softening effects is at least about 0.05% by weight of the total.

As hereinbefore indicated, the novel compositions of this invention find their particular and peculiar utility in bakery products wherein the principal leavening agent employed is yeast. The most common of such products are, of course, white and dark breads, rolls and cakes, etc. When the new additives are incorporated in the doughs from which these foods are then baked, the products formed are found to be greatly improved in shelf-life and grain texture qualities and to maintain desirable softness properties in the store and on the housewife's shelf much longer than yeast-leavened bakery products made with the corresponding prior art lactylates.

The following examples are given simply to illustrate this invention, but not in any way to limit its scope. The particle size data in these examples were obtained by standard means, employing the hereinbefore mentioned Fisher Sub-Sieve Sizer to obtain the average diameter size of the particles in a given product, arbitrarily assuming the particles to be spherical, and in conjunction with a Coulter Counter device to obtain the spread of particle sizes within the given lactylate. The Fisher machine is manufactured by the Fisher Scientific Company of New York, N.Y. and is designed to measure the size of solid particles within the 0.2–50 micron range, i.e., below the size ranges for which sieve measurements are adapted. This machine operates on the principle that particles in the path of a regulated air-flow will impede that air-flow in a way that is directly related to their size. This particular air permeability principles is described in more detail in Industrial & Engineering Chemistry, Analytical Edition, vol. 12, No. 8, pages 479–482 (1940). From the average spherical diameter size in microns obtained on the Fisher Sub-Sieve Sizer for a given lactylate, the surface area of that particular material is then easily calculated in terms of square meters per gram utilizing the following equation:

$$\frac{4r^2}{4/3r^3} \times \frac{cm.^3}{1.1 \text{ grams(sp. grav.)}} \times \frac{10,000\mu}{cm.} \times \frac{1 \text{ m.}^2}{10,000 \text{ cm.}^2}$$
$$= \frac{3}{r} \times \frac{1}{1.1} = \frac{3}{1.1(r)}$$

(where $r$=the average radius of the particle, i.e., one-half of the given spherical diameter).

EXAMPLE I

Commercial calcium stearyl-2-lactylate, having coarse particle sizes (Fisher average spherical diameter —$28\mu$), was passed through a fluid energy mill. Particle size data on the final product of the single mill pass were then found to be as follows:

Average diameter (Fisher Sub-Sieve Sizer)—$2.0\mu$
Coulter Counter data for the 50% range—$2.4\mu$
2% of the particles finer than $0.67\mu$ diameter
5% of the particles finer than $0.85\mu$ diameter
10% of the particles finer than $1.1\mu$ diameter
20% of the particles finer than $1.5\mu$ diameter
100% of the particles fined than $20.0\mu$ diameter

EXAMPLE II

Calcium stearyl-2-lactylate as prepared in the above example was tested as a bread softener by the following technique:

| 4-hour sponge: | Grams |
|---|---|
| Flour | 1120 |
| Water | 615 |
| Yeast | 40 |
| Dough conditioner[1] | 8 |

[1] Potassium bromate, 0.3%; ammonium chloride, 9.7%; calcium sulfate, 25%; sodium chloride, 10%; and starch, 55%.

These ingredients were added to the McDuffee bowl of a Hobart mixer in the order listed and mixed for one minute at No. 1 speed, using a 3-spindle fork. The bowl was then scraped down and the sponge again mixed for one minute at the No. 2 speed. The sponge was removed from the bowl at this point, placed in a polyethylene bag and allowed to ferment at room temperature (about 77° F.) for four hours.

To prepare the ultimate bread dough for the test, sponge so prepared was placed in a ten-quart stainless-steel Hobart mixing bowl and the following ingredients were thereafter added:

| Dough portion: | Grams |
|---|---|
| Flour | 480 |
| Water | 417 |
| Sugar (granulated) | 128 |
| Salt | 34 |
| Calcium propionate (preservative) | 2 |
| Milk powder | 48 |
| Lard | 40 |
| Bread softener | 8 |

This mixture was mixed on No. 1 speed for one minute and then on No. 2 speed for seven minutes using a dough hook. The resultant dough was then removed from the bowl, placed in a polyethylene bag and allowed to ferment for 25 minutes at room temperature (about 77° F.). It was then scaled into 1 lb. portions, with at least four such portions being prepared for each test. These portions were rolled into small balls by hand in order to exclude large air bubbles and gas pockets. Each ball was then run through a sheeter twice, using a 5/16 inch setting for the first pass and 3/16 inch setting for the second pass. The sheeted dough was next molded into a cylinder approximately as long as the pan in which it was to be baked, then placed in a greased pan, and transferred to a proof box and proofed (allowing to rise) for one hour at 120° F. and 85 percent relative humidity. The proofed dough was then baked at 430° F. for 25 minutes and the resulting bread subsequently allowed to cool for one hour.

All but one of the bread loaves obtained in this manner for each test were then packaged into polyethylene bags and stored either at room temperature or under refrigeration conditions (45° F.) for various length of time, usually from one day to a week, at the end of which time the staling rate was measured. Each of the unpackaged loaves, on the other hand, was sliced and its initial softness determined as a control.

The determination of staling for each loaf was then made by a standard compression test. Two 1-inch thick slices of bread were cut from each loaf, one slice being taken from the center of the loaf and the other approximately one inch from the end. The compression test was performed with a standard penetrometer using a 1-inch diameter flat stainless-steel disc in place of the usual vaseline cone. A 150 g. weight was used at the load on the end of the compression disc. The load was placed on the slice for a period of ten seconds, after which time the penetration was determined in tenths of millimeters. Three compressions are performed on each slice of bread, two in the bottom corners of the slice and the third at the top center. All these data were recorded and the six values for each loaf were then averaged.

In the following table, there are presented the compression data obtained in this manner, not only for the lactylate product of the aforementioned example but also for the lactylate prior art bread softener as well:

| Softener test sample | Bread loaf sp. vol. (cc./g.) | Average compressions (10⁻¹ millimeters) | | | |
|---|---|---|---|---|---|
| | | Room temp., 2 days | Room temp., 3 days | Room temp., 4 days | Room temp., 5 days |
| Prior art calcium stearyl-2-lactylate | 5.68 | 89 | 72 | 64 | 55 |
| Calcium stearyl-2-lactylate of Example I | 5.72 | 96 | 82 | 72 | 64 |

EXAMPLE III

The procedure of the previous two examples is repeated except that sodium stearyl-2-lactylate and potassium stearyl-2-lactylate are the coarse starting materials respectively employed in place of the commercially available calcium salt. In each case, the corresponding microcrystalline form of compound is obtained having about the same particle size analysis as the product of Example I. In both instances, the results obtained in the baking tests with respect to bread softening action are found to be substantially the same as was the case with microcrystalline calcium stearyl-2-lactylate, as previously reported in the table of Example II.

EXAMPLE IV

One part by weight of commercial calcium stearyl-2-lactylate, having coarse particle sizes, was blended into five parts by weight of corn oil (available under the trademark name of Mazola) heated to a temperature of 120° C. by means of an electric hot stove. The salt was easily dispersed in the hot oil to give a good emulsion. On cooling, the resulting semisolid product was particularly suitable for incorporation into the dough per se, thereby providing not only the necessary shortening content for the finished baked goods but also the desired antistaling agent as well.

EXAMPLE V

Using the procedure of Example II, the microcrystalline lactylate products of Examples I and IV were respectively tested as bread softeners. In the following table, there are presented the compression data obtained in this manner as compared to the results achieved with prior art calcium stearyl-2-lactylate under the same exact conditions:

| Softener test sample | Bread loaf sp. vol. (cc./g.) | Average compressions (10⁻¹ millimeters) | | | |
|---|---|---|---|---|---|
| | | Room temp., 2 days | Room temp., 3 days | Room temp., 4 days | Room temp., 5 days |
| Prior art calcium stearyl-2-lactylate | 5.97 | 98 | 80 | 72 | 51 |
| Calcium stearyl-2-lactylate of Example I | 5.98 | 119 | 95 | 84 | 73 |
| Calcium stearyl-2-lactylate of Example IV | 5.90 | 114 | 94 | 82 | 71 |

What is claimed is:

1. The method of improving the shelf-life of yeast leavened bakery products, which comprises incorporating into the dough prior to baking an effective amount up to about 2.0% by weight of the flour of at least one of the sodium, potassium and calcium salts of stearyl-2-lactylic acid, the said salt having a surface area of at least about one square meter per gram and consisting of particles having an average spherical diameter of up to about five microns.

2. The method of claim 1 wherein the salt is calcium stearyl-2-lactylate and from about 0.1% to about 1.0% of said salt by weight of the flour is incorporated into the dough.

3. The method of improving the shelf-life of yeast leavened bakery products, which comprises incorporating therein prior to baking from about 0.05% to about 0.5% by flour weight of calcium stearyl-2-lactylate having a surface area of at least about 1.5 square meters per gram and consisting of particles having an average spherical diameter of up to about 3.5 microns.

References Cited

UNITED STATES PATENTS

| | | | |
|---|---|---|---|
| 2,744,825 | 5/1956 | Thompson et al. | 99—91 |
| 2,744,826 | 5/1956 | Thompson et al. | 99—93 |
| 3,379,535 | 4/1968 | Landfried et al. | 99—91 |

RAYMOND N. JONES, Primary Examiner